(12) United States Patent
Paczkowski et al.

(10) Patent No.: US 10,397,790 B2
(45) Date of Patent: Aug. 27, 2019

(54) HARDWARE-TRUSTED WIRELESS DATA COMMUNICATIONS OVER A WIRELESS RELAY

(71) Applicant: Sprint Communications Company L.P., Overland Park, KS (US)

(72) Inventors: Lyle Walter Paczkowski, Mission Hills, KS (US); George Jason Schnellbacher, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/953,160

(22) Filed: Apr. 13, 2018

(65) Prior Publication Data

US 2018/0302793 A1    Oct. 18, 2018

Related U.S. Application Data

(63) Continuation of application No. 15/486,826, filed on Apr. 13, 2017, now Pat. No. 9,980,144.

(51) Int. Cl.
*H04W 12/10* (2009.01)
*H04L 29/06* (2006.01)
(Continued)

(52) U.S. Cl.
CPC ............ *H04W 12/10* (2013.01); *G06F 21/57* (2013.01); *H04L 9/3268* (2013.01);
(Continued)

(58) Field of Classification Search
CPC .. H04W 12/10; H04W 12/04; H04L 12/4641; H04L 63/0823; H04L 63/0876
See application file for complete search history.

(56) References Cited

U.S. PATENT DOCUMENTS

| 7,324,645 B1 * | 1/2008 | Juopperi | H04W 12/06 380/247 |
| 7,844,816 B2 * | 11/2010 | Karchov | H04L 63/0823 713/156 |

(Continued)

FOREIGN PATENT DOCUMENTS

WO    2017003684    1/2017

OTHER PUBLICATIONS

European Telecommunications Standards Institute (ETSI), "Network Functions Virtualisation (NFV);NFV Security; Security and Trust Guidance," Group Specification, vol. NFV SEC, No. V1.1.1, Dec. 1, 2014, 57 pages.

*Primary Examiner* — Magdi Elhag

(57) ABSTRACT

A wireless access point has a physically-embedded hardware-trust key and serves User Equipment (UE) with hardware-trusted wireless data communications. The wireless access point receives a hardware-trust challenge number and responsively generates a hardware-trust result with the physically-embedded hardware-trust key and the hardware-trust challenge number. The wireless access point transfers the hardware-trust result and receives an access hardware-trust digital certificate. The wireless access point wirelessly receives a hardware-trusted attachment request from the UE and wirelessly transfers the access hardware-trust digital certificate to the UE. The UE validates the access hardware-trust digital certificate. The wireless access point wirelessly exchanges user data with the UE responsive to the UE validating the access hardware-trust digital certificate. The wireless access point exchanges the user data with a data network.

18 Claims, 6 Drawing Sheets

(51) Int. Cl.
*H04W 76/11* (2018.01)
*G06F 21/57* (2013.01)
*H04W 12/06* (2009.01)
*H04W 12/04* (2009.01)
*H04L 9/32* (2006.01)
*H04L 12/28* (2006.01)
*H04W 12/08* (2009.01)
*H04W 84/04* (2009.01)
*H04W 84/18* (2009.01)

(52) U.S. Cl.
CPC ...... *H04L 12/2869* (2013.01); *H04L 63/0823* (2013.01); *H04L 63/0876* (2013.01); *H04W 12/04* (2013.01); *H04W 12/06* (2013.01); *H04W 76/11* (2018.02); *H04L 2209/80* (2013.01); *H04W 12/08* (2013.01); *H04W 84/047* (2013.01); *H04W 84/18* (2013.01)

(56) References Cited

U.S. PATENT DOCUMENTS

| | | | |
|---|---|---|---|
| 8,019,999 B2 | 9/2011 | Candelore | |
| 8,176,328 B2* | 5/2012 | Chen | H04L 63/0823 |
| | | | 380/277 |
| 8,522,018 B2 | 8/2013 | Molina et al. | |
| 8,650,398 B2* | 2/2014 | Nagai | H04L 9/0877 |
| | | | 713/168 |
| 9,083,696 B1* | 7/2015 | Khaitan | H04L 63/0823 |
| 9,100,188 B2 | 8/2015 | Spiers et al. | |
| 9,100,773 B2 | 8/2015 | Lambert et al. | |
| 9,317,708 B2* | 4/2016 | Lee | G06F 21/6218 |
| 9,473,309 B2 | 10/2016 | Courtney et al. | |
| 9,559,851 B2* | 1/2017 | Negi | H04L 9/0841 |
| 9,578,508 B2 | 2/2017 | Duggan et al. | |
| 9,743,436 B1* | 8/2017 | Bradish | H04W 8/26 |
| 9,980,144 B1* | 5/2018 | Paczkowski | H04L 12/4641 |
| 2009/0133097 A1 | 5/2009 | Smith et al. | |
| 2011/0305339 A1 | 12/2011 | Norrman et al. | |
| 2012/0297474 A1* | 11/2012 | Zhang | H04L 63/0823 |
| | | | 726/10 |
| 2013/0097317 A1 | 4/2013 | Sheleheda et al. | |
| 2014/0007087 A1 | 1/2014 | Scott-Nash et al. | |
| 2016/0065589 A1 | 3/2016 | Leighton et al. | |
| 2016/0119846 A1 | 4/2016 | Chou et al. | |
| 2016/0234725 A1 | 8/2016 | Paczkowski et al. | |
| 2016/0381150 A1 | 12/2016 | Rajagopal et al. | |
| 2017/0012968 A1 | 1/2017 | Feng et al. | |
| 2017/0064699 A1* | 3/2017 | Rajagopal | H04L 5/0007 |
| 2017/0223530 A1 | 8/2017 | Marquardt et al. | |
| 2018/0114012 A1* | 4/2018 | Sood | G06F 21/53 |
| 2018/0191497 A1* | 7/2018 | Paczkowski | H04L 9/0861 |
| 2018/0332471 A1* | 11/2018 | Zhu | H04W 76/10 |

* cited by examiner

US 10,397,790 B2

HARDWARE-TRUSTED WIRELESS DATA COMMUNICATIONS OVER A WIRELESS RELAY

RELATED CASES

This patent application is a continuation of U.S. patent application Ser. No. 15/486,826 that was filed on Apr. 13, 2017 and is entitled "HARDWARE-TRUSTED WIRELESS DATA COMMUNICATIONS OVER A WIRELESS RELAY." U.S. patent application Ser. No. 15/486,826 is hereby incorporated by reference into this patent application.

TECHNICAL BACKGROUND

Data communication networks serve User Equipment (UE) with data communication services like internet access, voice calling, social networking, and the like. To extend the range and mobility of these data communication services, the data communication networks deploy wireless access networks. The wireless access networks have wireless base stations that communicate wirelessly with the UEs. The wireless base stations are also coupled to the data communication networks. Wireless relays are used to further extend the range of the wireless base stations. Thus, wireless relays exchange user data between the UEs and the wireless base stations.

Hardware trust entails the physical validation of the computer hardware that executes computer software. The computer hardware has a physically-embedded, read-only, secret key. A remote hardware trust server challenges the computer software with a random number to prove hardware trust. The computer software reads and hashes the secret code with the random number to generate a hardware trust result that it sends to the hardware trust server. The hardware trust server hashes the same random number with its own copy of the secret key to validate hardware trust from the computer software.

Unfortunately, the integration of hardware trust in the wireless relays is not efficient and effective. In particular, wireless relays that offer both hardware-trusted and normal wireless communication services have not been optimized.

TECHNICAL OVERVIEW

A wireless access point has a physically-embedded hardware-trust key and serves User Equipment (UE) with hardware-trusted wireless data communications. The wireless access point receives a hardware-trust challenge number and responsively generates a hardware-trust result with the physically-embedded hardware-trust key and the hardware-trust challenge number. The wireless access point transfers the hardware-trust result and receives an access hardware-trust digital certificate. The wireless access point wirelessly receives a hardware-trusted attachment request from the UE and wirelessly transfers the access hardware-trust digital certificate to the UE. The UE validates the access hardware-trust digital certificate. The wireless access point wirelessly exchanges user data with the UE responsive to the UE validating the access hardware-trust digital certificate. The wireless access point exchanges the user data with a data network.

DETAILED DESCRIPTION

Figure 1:
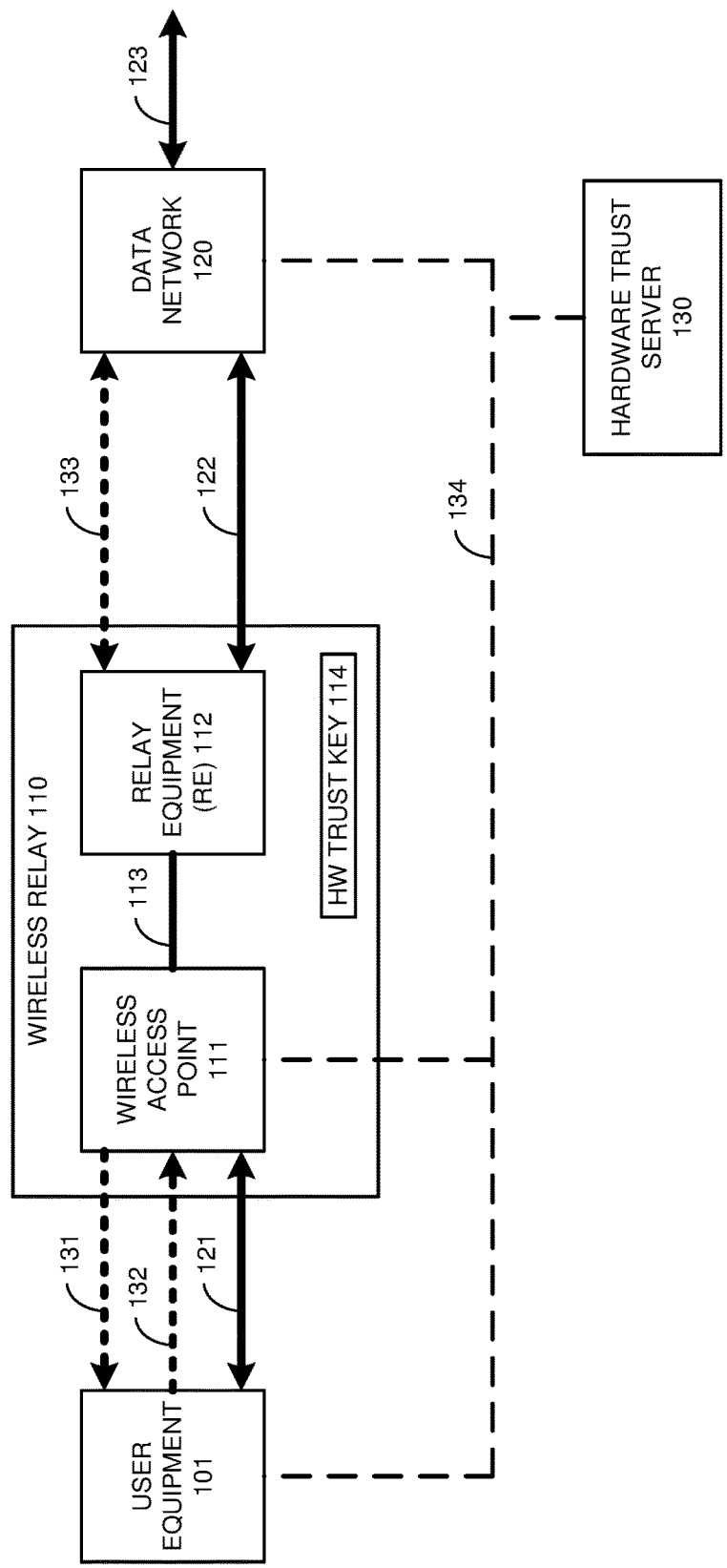
FIG. 1 illustrates a wireless relay to serve User Equipment (UE) with hardware-trusted wireless data communications over Institute of Electrical and Electronics Engineers (IEEE) 802.11 links and Long Term Evolution (LTE) links.

FIG. 1 illustrates wireless relay 110 to serve User Equipment (UE) 101 with hardware-trusted wireless data communications over Institute of Electrical and Electronics Engineers (IEEE) 802.11 links and Long Term Evolution (LTE) links. Wireless relay 110 comprises wireless access point 111, Relay Equipment (RE) 112, data links 113, and hardware trust (HW) key 114. UE 101 comprises a computer, phone, or some other intelligent data machine with wireless communication components.

Wireless access point 111 comprises antennas, amplifiers, modulators, filters, signal processors, and a computer system. The computer system comprises Central Processing Units (CPUs), Random Access Memory (RAM), data storage, Input/Output (I/O) transceivers, and bus interfaces. The CPUs retrieve software from the memories and execute the software to direct the operation of the other computer system components. The software comprises modules for hardware trust, operating system, virtualization, data networking, resource scheduling, UE attachment, UE data service, and network connectivity. In some examples, wireless access point 111 comprises an LTE eNodeB with LTE transceivers and IEEE 802.11 transceivers.

RE 112 comprises antennas, amplifiers, modulators, filters, signal processors, and a computer system. The computer system comprises CPUs, Random RAM, data storage, I/O transceivers, and bus interfaces. The CPUs retrieve software from the memories and execute the software to direct the operation of the other RE components. The software comprises modules for hardware trust, operating system, data networking, wireless access point interface, RE attachment, and RE data service. In some examples, RE 112 comprises a UE that is adapted to serve wireless access point 111.

Data links 113 comprise metallic, wireless, and/or optical data links along with integrated control circuitry and software. In some examples, data links 113 comprise an IEEE 802.3 switch and associated cabling. Hardware trust key 114 comprises a physically-embedded, read-only, secret code that is also known to hardware trust server 130.

Hardware trust server 130 communicates with UE 101, wireless access point 111, and data network 120 over data network 134. Data network 134 may use data network 120 and wireless relay 110. To establish hardware trust, hardware trust server 130 issues a random number challenge to wireless access point 111 over data network 134. Wireless access point 111 reads hardware trust key 114 and hashes key 114 with the random number to generate a hardware trust result. Wireless access point 111 transfers the hardware trust result to hardware trust server 130.

Hardware trust server 130 hashes its own copy of the hardware trust key with the same random number to generate the same hardware trust result. If the hardware trust results match, then wireless access point 111 has hardware trust with hardware trust server 130. In response to establishing hardware trust, hardware trust server 130 issues a hardware trust digital certificate to wireless access point 111. The hardware trust digital certificate is digitally signed by hardware trust server 130 and can be validated with the public key for hardware trust server 130.

Hardware trust server 130 establishes hardware trust and issues hardware trust digital certificates to UE 101 and data network 120 in a similar manner. Wireless access point 111 and UE 101 establish and maintain hardware trust by exchanging and validating their hardware trust digital certificates. RE 112 and data network 120 establish and maintain hardware trust by exchanging and validating their hardware trust digital certificates. Wireless access point 111 and RE 101 exchange their hardware trust data over data links 113.

Wireless relay 110 serves UE 101 with hardware-trusted wireless data communications over wireless communication links 121-122. Wireless communication links 121 comprise at least IEEE 802.11 links and LTE links. Wireless communication links 122 comprise IEEE 802.11 links, LTE links, or some other type of wireless links. RE 112 and data network 120 may perform channel bonding on wireless communication links 122.

Wireless access point 111 broadcasts wireless pilot signals 131 that comprise an IEEE 802.11 Service Set Identifier (SSID) and a Long-Term Evolution (LTE) Network Identifier (NID). The SSID and NID are coded to indicate hardware-trusted communication service to UE 101. For example, UE 101 may store various bit strings that correspond to these IDs. UE 101 receives the IEEE 802.11 SSID and LTE NID and selects one of them for a hardware-trusted attachment. UE 101 wirelessly transfers hardware-trusted attachment request 132 that indicates the selected SSID or NID.

The hardware-trusted attachment request includes the hardware-trust digital certificate for UE 101. Wireless access point 111 uses the public key for hardware trust server 130 to validate the hardware-trust digital certificate for UE 101. Wireless access point 111 then establishes a hardware-trusted attachment of UE 101 responsive to the hardware-trust validation of UE 101. Wireless access point 111 notifies RE 112 of the hardware-trusted attachment of UE 101. Wireless access point 111 may transfer its own hardware-trust digital certificate to UE 101 responsive to its hardware-trust of UE 101. UE 101 will abandon the attachment if its own hardware trust validation of wireless access point 111 fails.

Wireless access point 111 uses hardware-trusted circuitry to wirelessly exchange user data with UE 101 in response to the hardware-trusted attachment of UE 101. In some examples, the hardware-trusted circuitry executes a hardware-trusted application or Virtual Network Function (VNF). The hardware-trusted circuitry may then direct all communications from UE 101 to the hardware-trusted application or VNF. Thus, wireless access point 101 effectively attaches UE 101 to the hardware-trusted application or VNF. Additional information from hardware-trusted UE 101 or its digital certificate can be used to select a specific hardware-trusted application or VNF for UE 101. For example, the International Mobile Subscriber Identifier (IMSI) for UE 101 could be used after UE 101 establishes hardware trust to select a specific hardware-trusted application or VNF for UE 101 attachment.

Wireless access point 111 and RE 112 exchange the user data over a hardware-trusted one of data links 113 responsive to the hardware-trusted attachment of UE 101. In some examples, and an application or VNF may direct this data transfer. RE 112 uses hardware-trusted circuitry to wirelessly exchange the user data with data network 120 over hardware-trusted wireless backhaul links 122 responsive to the hardware-trusted attachment of UE 101.

Although not shown for clarity, wireless access point may also broadcast a normal SSID and a normal NID for normal UE attachments that do not include the above-described hardware trust feature. UEs that attach using the normal SSID or NID could be served in a conventional manner. Although the hardware-trusted software and data and the normal software and data may share some components in wireless relay 110, wireless relay 110 maintains isolation between the hardware-trusted software and data and the normal software and data through physical hardware separation or through separate time-sliced operation.

In some examples, wireless access point 111 executes a hardware-trusted application and attaches UE 101 to the hardware-trusted application. The hardware-trusted application could be a Virtual Network Function (VNF). The VNF in wireless access point 111 and other VNFs in data network 120 may cross-validate their hardware trust. Moreover, wireless access point 111 may execute its VNF during a Network Function Virtualization (NFV) processing cycle. The NFV processing cycle comprises the CPU cycles in wireless access point 111 that are allocated to the VNF. The VNF indicates its NFV processing cycle during hardware trust validation by hardware trust server 150. Hardware trust server 150 then adds the NFV processing cycle to the hardware trust digital certificate for the VNF.

In these NFV examples, an NFV Infrastructure (NFVI) executes other VNFs during NFV processing cycles. These NFV processing cycle comprises the CPU cycles in the NFVI that are allocated to the VNFs. The NFVI VNFs indicate their NFV processing cycles during their hardware trust validation, and hardware trust server 150 adds their NFV processing cycles to their hardware trust digital certificates. Thus, the VNF in wireless access point 111 and the other VNFs in data network 120 may cross-validate their actual NFV processing cycles by exchanging and validating their hardware trust digital certificates.

In some examples, wireless access point 111 executes a hardware-trusted application or VNF. The hardware-trusted attachment of UE 101 could restrict UE 101 to only communication with the hardware-trusted application or VNF. The hardware-trusted application or VNF may cross-validate hardware trust and NFV processing cycles with VNFs in data network 120. The hardware-trusted application or VNF may then communicate for UE 101 with the hardware-trusted VNFs in data network 120

Note that the hardware trust tasks that are performed by wireless access point 111 could be partially or totally performed by RE 112 or some other components in wireless relay 110.

Figure 2:
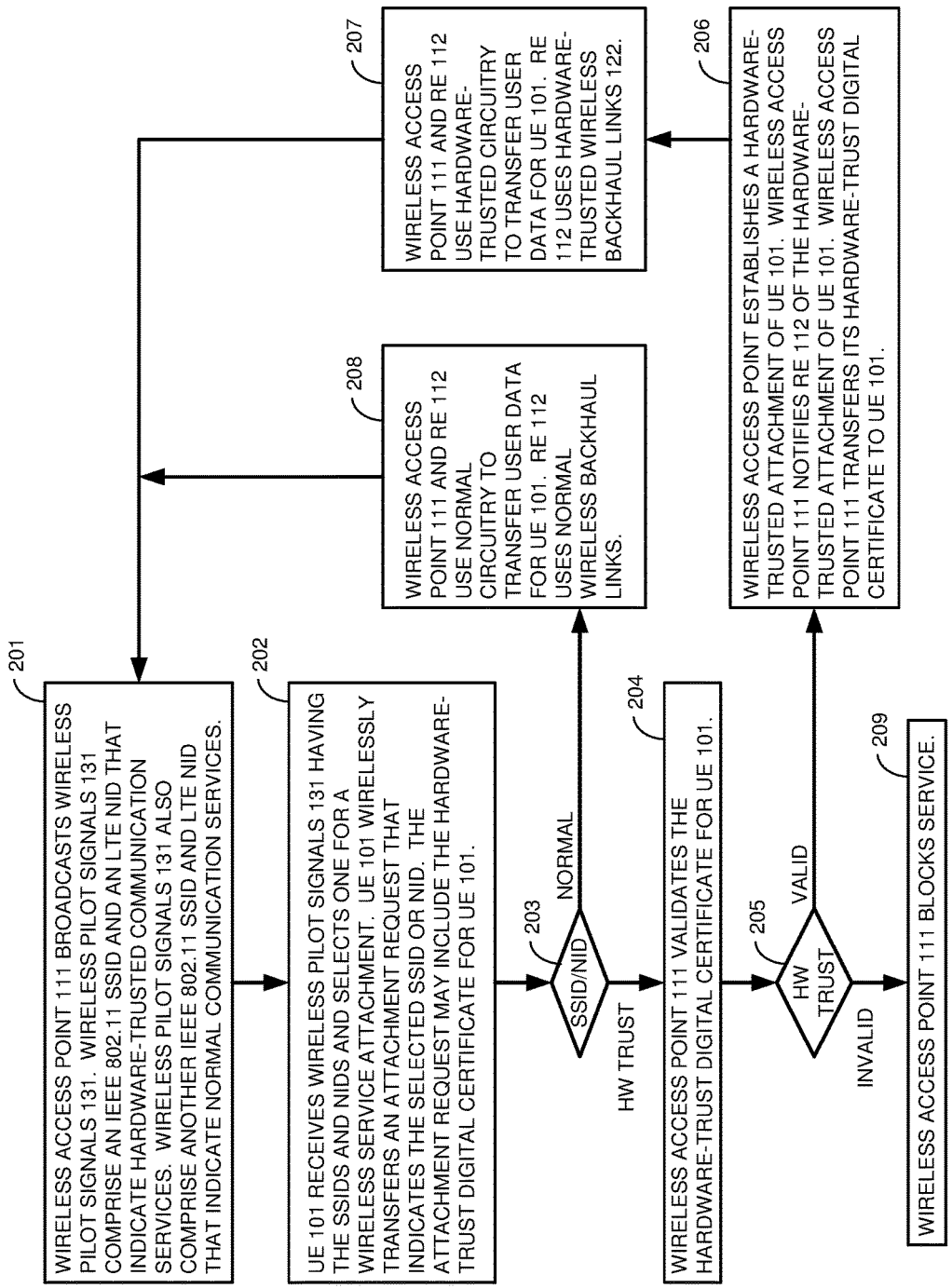
FIG. 2 illustrates the operation of the wireless relay to serve the UE with hardware-trusted wireless data communications over the IEEE 802.11 links and LTE links.

FIG. 2 illustrates the operation of wireless relay 110 to serve UE 101 with hardware-trusted wireless data communications over IEEE 802.11 links and LTE links. Wireless access point 111 broadcasts wireless pilot signals that comprise IEEE 802.11 SSIDs and LTE NIDs (201). Some of the SSIDs and NIDs are specially coded to indicate hardware-trusted communication service to UE 101, while other SSIDs and NIDs are coded to indicate normal communication service. UE 101 receives the IEEE 802.11 SSIDs and LTE NIDs and selects one for a wireless service attachment (202). UE 101 wirelessly transfers a wireless service attachment request that indicates the selected SSID or NID (202). The attachment request may include the hardware-trust digital certificate for UE 101.

If the selected SSID or NID is for hardware-trusted service (203), then wireless access point 111 validates the hardware-trust digital certificate for UE 101 (204). If the hardware-trust digital certificate for UE 101 is valid (205), then wireless access point 111 establishes a hardware-trusted attachment of UE 101 (206). Wireless access point 111 notifies RE 112 of the hardware-trusted attachment of UE 101 (206). Wireless access point 111 transfers its own hardware-trust digital certificate to UE 101 (206). Wireless access point 111 and RE 112 use hardware-trusted circuitry to exchange user data for UE 101 (207). RE 112 exchanges the user data with data network 120 over hardware-trusted wireless backhaul links 122 (207).

If the selected SSID or NID is for normal service (203), then wireless access point 111 and RE 112 use normal circuitry to exchange user data for UE 101 (208). RE 112 exchanges the user data with data network 120 over normal wireless backhaul links (208).

If the hardware-trust digital certificate for UE 101 is invalid (205), then wireless access point 111 blocks wireless communication service to UE 101—although normal service might still be allowed (209).

Figure 3:
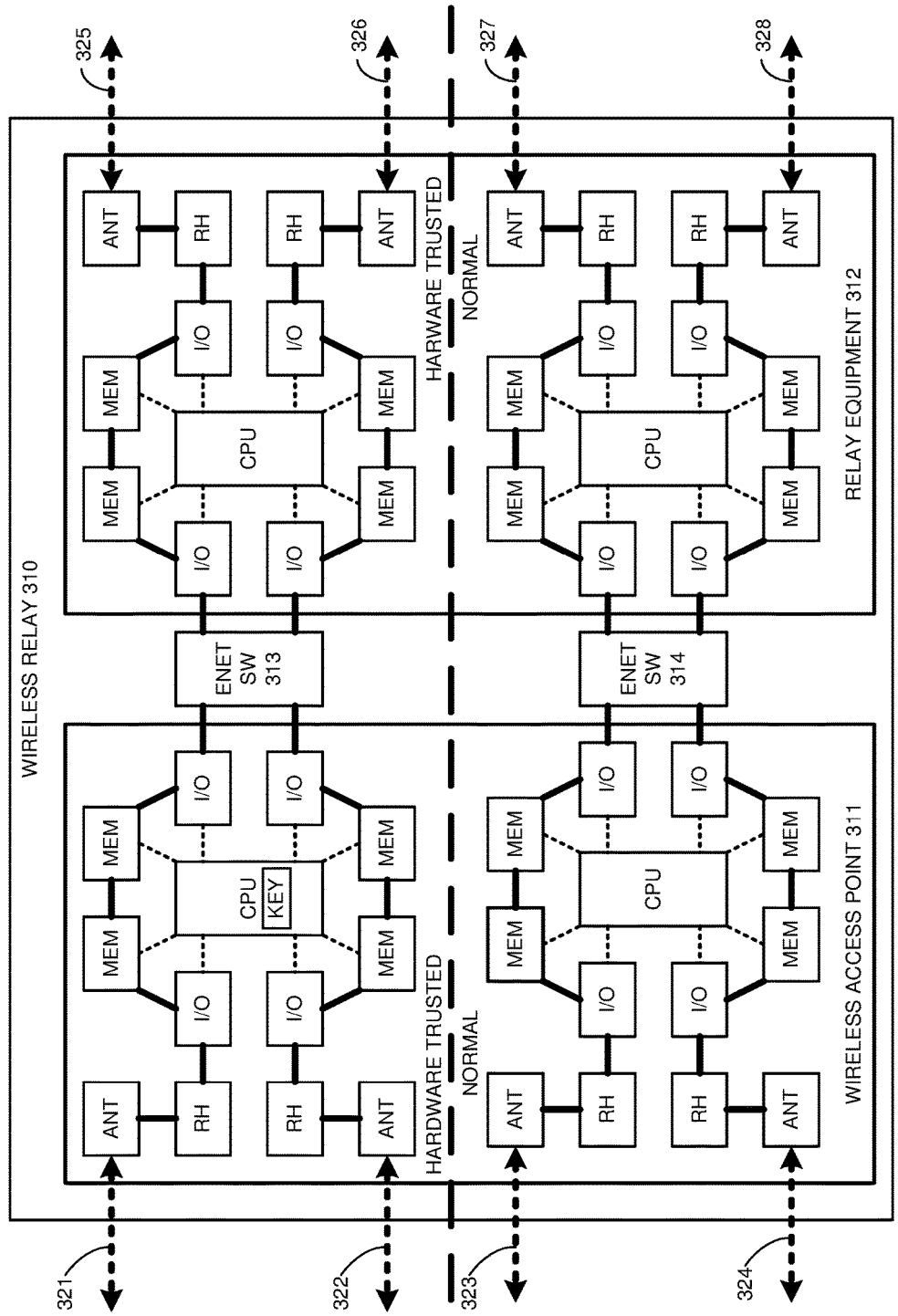
FIG. 3 illustrates a wireless relay to serve a UE with normal and hardware-trusted wireless communication services over IEEE 802.11 links and LTE links.

FIG. 3 illustrates wireless relay 300 to serve a UE with normal and hardware-trusted wireless communication services over IEEE 802.11 links and LTE links. Wireless relay 300 comprises wireless access point 311, relay equipment 312, and IEEE 802.3 (ENET) switches 313-314. ENET switches 313 and/or 314 may have IEEE 802.3 links to Local Area Networks and Wide Area Networks (LANs/WANs) that also connect to the data network. Both wireless access point 311 and relay equipment 312 have an upper hardware-trusted portion and a lower normal portion as indicated by the bold horizontal dashed line. Hardware trust software controls the CPUs in the hardware-trusted portion during boot-up and beyond to protect the hardware-trusted CPUs and MEMs from untrusted data and software and to perform hardware trust tasks.

The hardware-trusted portion of wireless access point 311 has an upper IEEE 802.11 signal path that comprises an upper antenna (ANT), radio head (RH), transceiver (I/O), memory (MEM), MEM, and I/O. The upper ANT exchanges wireless 802.11 signals 321 with UEs. Wireless 802.11 signals 321 include a hardware-trusted SSID broadcast. The upper I/O exchanges data with ENET switch 313. The hardware-trusted portion of wireless access point 311 has a lower LTE signal path that comprises a lower ANT, RH, I/O, MEM, MEM, and I/O. The lower ANT exchanges wireless LTE signals 322 with the UEs. LTE signals 322 include a hardware-trusted NID broadcast. The lower I/O exchanges data with ENET switch 313. The hardware-trusted portion of wireless access point 311 has a CPU to direct the operations of the hardware-trusted IEEE 802.11 and LTE signal paths. The CPU has a physically-embedded, read-only, secret, hardware trust key.

The hardware-trusted portion of relay equipment 312 has an upper IEEE 802.11 signal path that comprises an upper I/O, MEM, MEM, I/O, RH, and ANT. The upper I/O exchanges data with ENET switch 313. The upper ANT exchanges wireless 802.11 signals 325 with a data network. The hardware-trusted portion of relay equipment 312 has a lower LTE signal path that comprises a lower I/O, MEM, MEM, I/O, RH, and ANT. The lower I/O exchanges data with ENET switch 313. The lower ANT exchanges wireless LTE signals 326 with the data network.

The normal portion of wireless access point 311 has an upper IEEE 802.11 signal path that comprises an upper ANT, RH, I/O, MEM, MEM, and I/O. The upper ANT exchanges wireless 802.11 signals 323 with the UEs. Wireless 802.11 signals 323 include a normal SSID broadcast. The upper I/O exchanges data with ENET switch 314. The normal portion of wireless access point 311 has a lower LTE signal path that comprises a lower ANT, RH, I/O, MEM, MEM, and I/O. The lower ANT exchanges wireless LTE signals 324 with the UEs. LTE signals 324 include a normal NID broadcast. The lower I/O exchanges data with ENET switch 314. The normal portion of wireless access point 311 has a CPU to direct the operations of the normal IEEE 802.11 and LTE signal paths. The normal portion of relay equipment 312 has an upper IEEE 802.11 signal path that comprises an upper I/O, MEM, MEM, I/O, RH, and ANT. The upper I/O exchanges data with ENET switch 314. The upper ANT exchanges wireless 802.11 signals 327 with the data network. The normal portion of relay equipment 312 has a lower LTE signal path that comprises a lower I/O, MEM, MEM, I/O, RH, and ANT. The lower I/O exchanges data with ENET switch 314. The lower ANT exchanges wireless LTE signals 328 with the data network.

Alternative architectures for wireless relay 300 are possible. For example, the normal and hardware-trusted portions of wireless access point 311 could share the same 802.11 ANT and RH and/or the same LTE ANT and RH. In a like manner the normal and hardware-trusted portions of relay equipment could share the same 802.11 ANT and RH and/or the same LTE ANT and RH. Isolation between the normal and hardware-trusted portions of the ANTs and RHs could be maintained by using different frequencies or different times.

In another alternative architecture for wireless relay 300, the normal and hardware-trusted portions of wireless access point 311 could share the same I/Os, MEMs, and CPUs. In a like manner the normal and hardware-trusted portions of relay equipment 312 could share the same I/Os, MEMs, and CPUs. Isolation between the normal and hardware-trusted portions of the I/Os is maintained by using different times or signal paths. Isolation between the normal and hardware-trusted portions of the CPUs is maintained by using different times or processing cores. Isolation between the normal and hardware-trusted portions of the MEMs is maintained by using different times or memory spaces.

In another alternative architecture for wireless relay 300, the IEEE 802.11 or the LTE sections of relay equipment 312 could be omitted and the remaining one of the IEEE 802.11 or the LTE sections could be used.

In operation, wireless access point 311 receives a random number challenge from a hardware trust server. Hardware trust software directs the CPU in the hardware-trusted portion of wireless access point 311 to read and hash the hardware trust key with the random number to generate a hardware trust result. Wireless access point 311 transfers the hardware trust result to the hardware trust server. The hardware trust server hashes its own copy of the hardware trust key with the same random number to generate the same hardware trust result. If the hardware trust results match, then wireless access point 311 has hardware trust with the hardware trust server. In response to establishing hardware trust, the hardware trust server issues a hardware trust digital certificate to wireless access point 311. The hardware trust digital certificate is digitally signed by the hardware trust server and can be validated with the public key for the hardware trust server. The hardware trust server establishes hardware trust and issues hardware trust digital certificates to the UEs and the data network in a similar manner. Hardware trust software drives the CPU in the hardware-trusted portion of relay equipment 312 to exchange hardware trust digital certificates with the data network to maintain hardware-trusted backhaul links over wireless IEEE 802.3 signals 325 and LTE signals 326.

Subsequently, a UE wirelessly transfers a hardware-trusted attachment request over wireless IEEE 802.11 signals 321 or LTE signals 322. The hardware-trusted attachment request indicates the hardware-trusted SSID or NID and the hardware trust digital certificate for the UE. The hardware trust software drives the hardware-trusted CPU in wireless access point 311 to validate the hardware trust digital certificate for the UE before delivering communication service. The CPU then drives the hardware-trusted I/Os and MEMs to exchange hardware-trusted user data between wireless signals 321-322 and hardware-trusted ENET switch 313. In relay equipment 312, the hardware-trusted CPU drives the hardware-trusted I/Os and MEMs to exchange the hardware-trusted user data between hardware-trusted ENET switch 313 and wireless IEEE 802.11 signals 325 or LTE signals 326.

Later, the UE wirelessly transfers a normal attachment request over wireless IEEE 802.11 signals 323 or LTE signals 324. The normal attachment request indicates the normal SSID or NID. The normal CPU drives the normal I/Os and MEMs to exchange normal user data between wireless signals 323-324 and normal ENET switch 314. In relay equipment 312, the normal CPU drives the normal I/Os and MEMs to exchange the normal user data between normal ENET switch 314 and wireless IEEE 802.11 signals 327 or LTE signals 328.

Figure 4:
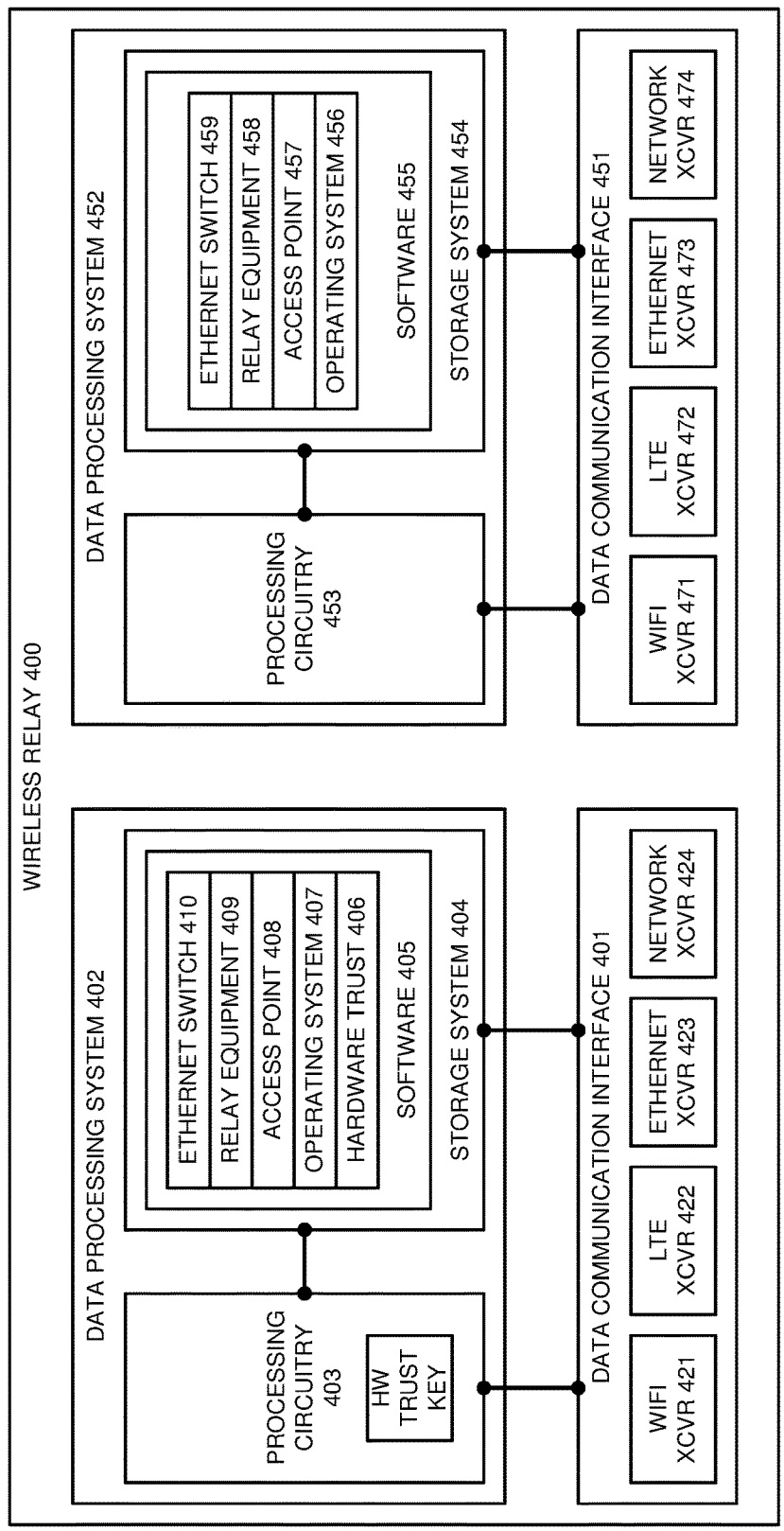
FIG. 4 illustrates a wireless relay to serve UEs with hardware-trusted and normal wireless communication services over IEEE 802.11 links and LTE links.

FIG. 4 illustrates wireless relay 400 to serve UEs with hardware-trusted and normal wireless communication services over IEEE 802.11 links and LTE links. Wireless relay 400 is an example of wireless relays 110 and 310, although those relays may use alternative configurations and operations. Wireless relay 400 comprises data communication interfaces 401 and 451 and data processing systems 402 and 452.

Data communication interface 401 comprises transceivers 421-424 for IEEE 802.11 (WIFI), LTE, IEEE 802.3 (Ethernet), and network. Network transceiver 424 may use IEEE 802.11, LTE, or some other wireless protocol. Network transceiver 424 may implement channel bonding. Data communication interface 451 comprises transceivers 471-474 for WIFI, LTE, Ethernet, and network. Network transceiver 474 may use IEEE 802.11, LTE, or some other wireless protocol. Network transceiver 474 may implement channel bonding. Transceivers 421-424 and 471-474 comprises communication components, such as antennas, amplifiers, filters, modulators, signal processors, ports, bus interfaces, memory, software, and the like.

Data processing system 402 comprises processing circuitry 403 and storage system 404. Storage system 404 stores software 405. Software 405 includes respective software modules 406-410. Data processing system 452 comprises processing circuitry 453 and storage system 454. Storage system 454 stores software 455. Software 455 includes respective software modules 456-459. Processing circuitry 403 and 453 comprises CPUs and RAM. Processing circuitry 403 includes a physically-embedded, read-only, secret hardware trust key.

Storage systems 404 and 454 comprise non-transitory, machine-readable, data storage media, such as flash drives, memory circuitry, and the like. Software 405 comprises machine-readable instructions that control the operation of processing circuitry 403 when executed. Software 455 comprises machine-readable instructions that control the operation of processing circuitry 453 when executed. All or portions of software 405 and 455 may be externally stored on one or more storage media, such as circuitry, discs, and the like.

When executed by processing circuitry 403, software modules 406-410 direct circuitry 403 to perform the following operations. Hardware trust software 406 asserts initial control over data processing system 402 and performs hardware trust operations. Operating system 407 interfaces between software 408-410 and system software/hardware under the control of hardware trust software 406. Access point software 408 directs wireless access operations for UEs. Relay equipment software 409 directs wireless access operations to the network for relay 400. Ethernet switch software 410 interfaces access point software 408 and relay equipment software 409.

When executed by processing circuitry 453, software modules 456-459 direct circuitry 453 to perform the following operations. Operating system 456 interfaces between software 457-459 and system software/hardware. Access point software 457 directs wireless access operations for UEs. Relay equipment software 458 directs wireless access operations to the network for relay 400. Ethernet switch software 459 interfaces access point software 557 and relay equipment software 458.

Alternative architectures for wireless relay 400 are possible. Data processing systems 402 and 452 could share data communication interface 401 and omit interface 451. Isolation between the normal and hardware-trusted data is maintained by using different frequencies, signal paths, or times. Data processing systems 402 and 452 could share processing circuitry 403 and omit circuitry 453. Isolation between the normal and hardware-trusted software/data is maintained by using context switching and different processing times. Data processing systems 402 and 452 could share storage system 404 and omit storage system 454. Isolation between the normal and hardware-trusted software/data is maintained by using different times or memory spaces.

Figure 5:
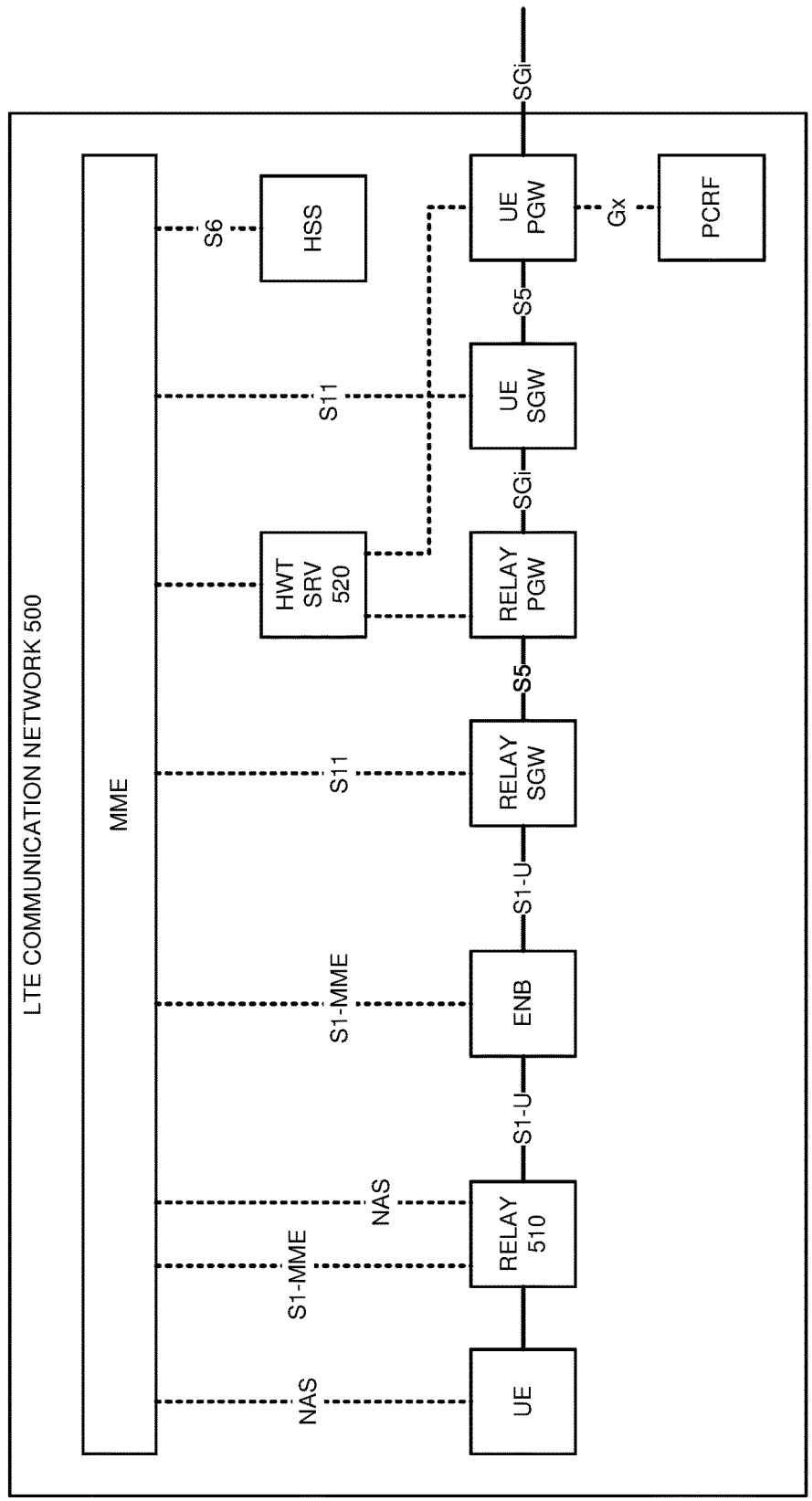
FIG. 5 illustrates an LTE network to serve a UE with normal and hardware-trusted wireless communication services over IEEE 802.11 links and LTE links.

FIG. 5 illustrates LTE communication network 500 to serve a UE with normal and hardware-trusted wireless communication services over IEEE 802.11 links and LTE links. LTE communication network 500 comprises: the UE, wireless relay 510, eNode-B (ENB), relay Serving Gateway (SGW), relay Packet Data Network Gateway (PGW), UE SGW, UE PGW, Policy Charging and Rules Function (PCRF), Mobility Management Entity (MME), Home Subscriber System (HSS), and Hardware Trust server (HWT SRV) 520. The UE and wireless relay 510 communicate over IEEE 802.11 or LTE links. Wireless relay 510 and the ENB communicate over S1-U links. The ENB and relay SGW communicate over S1-U links. The relay SGW and relay PGW communicate over S5 links. The relay PGW and UE SGW communicate over SGi links. The UE SGW and UE PGW communicate over S5 links. The UE PGW communicates with other system over SGi links. These other systems may include the Internet, Storage Area Networks (SANs), Internet protocol Multimedia Subsystems (IMSs), Content Delivery Networks (CDNs), enterprise networks, and the like.

The MME has the following signaling links: Non-Access Stratum (NAS) to the UE, S1-MME to wireless relay 510 for its ENB, NAS to wireless relay 510 for its RE, S1-MME to the ENB, S11 to the relay SGW and the UE SGW, and S6 to the HSS. The MME also has a signaling link to hardware trust server 520. Hardware trust server 520 has signaling links to the relay PGW and the UE PGW. Note that the UE NAS, relay S1-MME, and relay NAS traverse the S1-Us, S5s, and SGi data links to reach the MME.

Over these various signaling links, hardware trust server 520 challenges and validates hardware trust for the UE, wireless relay 510, ENB, SGWs, and PGWs. Over these various signaling links, hardware trust server 520 issues hardware trust digital certificates to the UE, wireless relay 510, ENB, SGWs, and PGWs. The UE and wireless relay 510 cross-validate their hardware trust digital certificates. Wireless relay 510 and the ENB cross-validate their hardware trust digital certificates. The ENB and relay SGW cross-validate their hardware trust digital certificates. The relay SGW and relay PGW cross-validate their hardware trust digital certificates. The relay PGW and the UE SGW cross-validate their hardware trust digital certificates. The UE SGW and the UE PGW cross-validate their hardware trust digital certificates. The UE-PGW and the other systems (SAN, CDN, IMS, enterprise) cross-validate their hardware trust digital certificates.

Wireless relay 510 broadcasts wireless pilot signals that comprise IEEE 802.11 SSIDs and LTE NIDs). Some of the SSIDs and NIDs indicate hardware-trusted communication service, while other SSIDs and NIDs indicate normal communication service. The UE receives the IEEE 802.11 SSIDs and LTE NIDs and selects one for wireless service attachment. The UE wirelessly transfers an attachment request that indicates the selected SSID or NID.

If the selected SSID or NID is for hardware-trusted service, then wireless relay 510 validates the hardware-trust digital certificate for the UE. If the hardware-trust digital certificate for the UE 101 is valid, then wireless relay 510 establishes a hardware-trusted attachment of the UE. Wireless relay 510 may attach the UE to a specific application or VNF based on its ID or a user service request. Wireless relay 510 uses hardware-trusted circuitry to exchange user data for the UE 101. Wireless relay 510 exchanges the user data over hardware-trusted wireless backhaul links to the UE PGW or other systems like SAN, IMS, or CDN. If the selected SSID or NID is for normal service, then wireless relay 510 uses normal circuitry to exchange user data for the UE. Wireless relay 510 exchanges the normal user data over normal wireless backhaul links to the UE PGW or the other systems.

Figure 6:
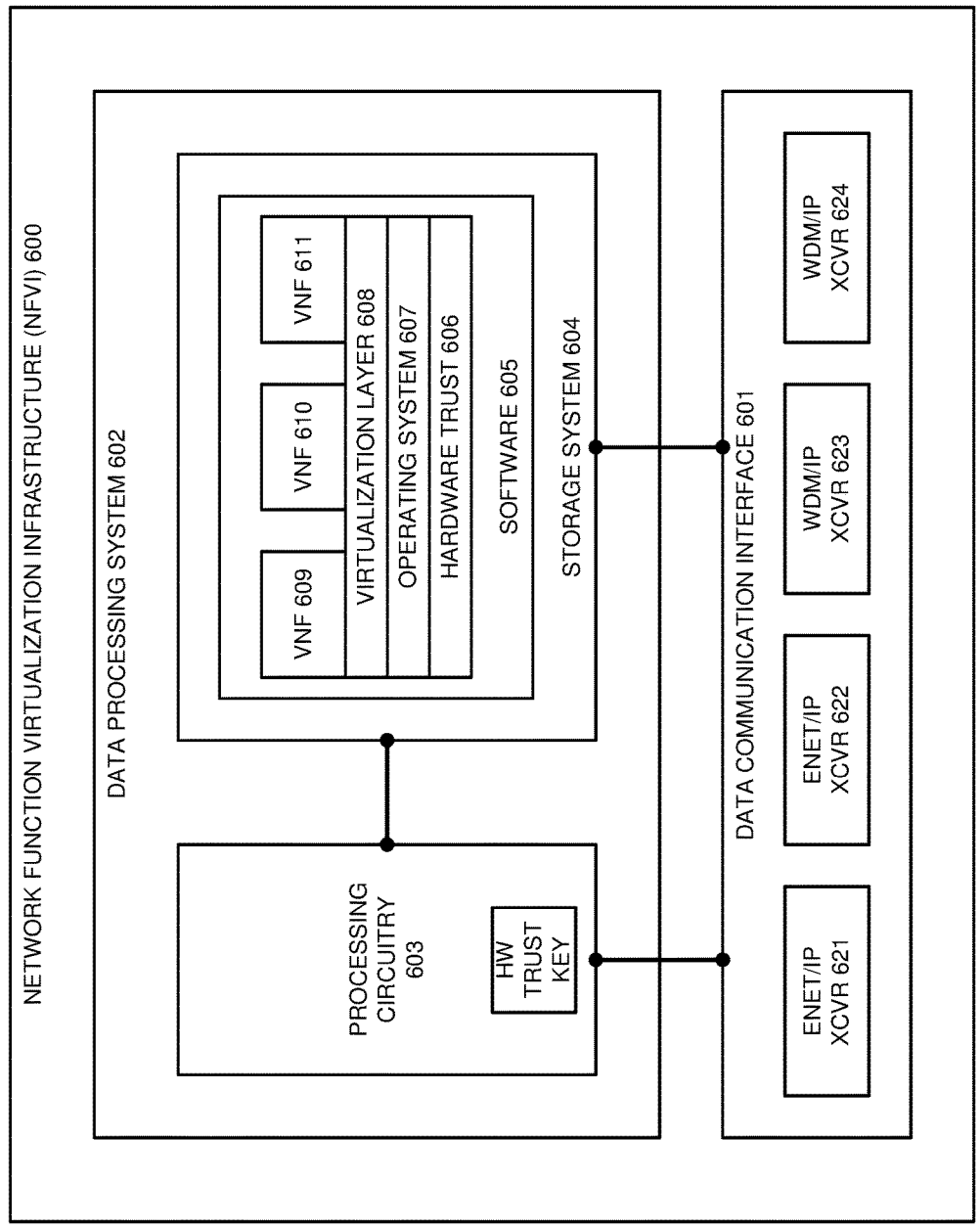
FIG. 6 illustrates a Network Function Virtualization Infrastructure (NFVI) to serve wireless relays that serve UEs with hardware-trusted wireless data communications.

FIG. 6 illustrates Network Function Virtualization Infrastructure (NFVI) 600 to serve wireless relays that serve UEs with hardware-trusted wireless data communications. NFVI 600 comprises data communication interface 601 and data processing system 602. Data communication interface 601 comprises transceivers 621-624 for Ethernet/IP and Wave Division Multiplex (WDM)/IP. Transceivers 621-624 comprise communication components, such as signal processors, ports, bus interfaces, memory, software, and the like.

Data processing system 602 comprises processing circuitry 603 and storage system 604. Storage system 604 stores software 605. Software 605 includes respective software modules 606-611. Processing circuitry 603 comprises CPUs and RAM. Processing circuitry 603 includes a physically-embedded, read-only, secret hardware trust key. Storage system 604 comprises non-transitory, machine-readable, data storage media, such as flash drives, memory circuitry, and the like. Software 605 comprises machine-readable instructions that control the operation of processing circuitry 603 when executed.

When executed by processing circuitry 603, software modules 606-610 direct circuitry 603 to perform the following operations. Hardware trust software 606 asserts initial control over data processing system 602 and performs hardware trust operations. Operating system 607 interfaces between virtualization layer 608 and system software/hardware under the control of hardware trust software 606. Virtualization layer 608 interfaces between operating system software 607 and Virtual Network Functions (VNFs) 609-611. VNFs 609-611 are executed during specific NFV processing cycles in processing circuitry 603. VNFs 609-611 report their NFV processing cycles during their hardware trust validation and the NFV processing cycles are indicated in their associated hardware trust digital certificates.

In a similar manner, a wireless relay may have virtualization layer software that interfaces between the relay operating system and relay VNFs. The relay VNFs are also executed during specific NFV processing cycles in the relay processing circuitry. The relay VNFs could report their NFV processing cycles during their hardware trust validation and the NFV processing cycles would be indicated in their associated hardware trust digital certificates.

In some examples, the wireless relay executes a hardware-trusted application or VNF. The hardware-trusted attachment of the UE could be an initial attachment to the hardware-trusted application or VNF. The hardware-trusted application or VNF may then cross-validate hardware trust and NFV processing cycles with VNFs in NFVI 600. The hardware-trusted application or VNF may then communicate for the UE with the hardware-trusted VNFs in NFVI 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point that has a physically-embedded, read-only hardware-trust key to serve User Equipment (UE) with hardware-trusted wireless data communications and wherein the wireless access point comprises hardware-trusted memory and normal memory, the method comprising:

the wireless access point receiving a hardware-trust challenge number and responsively generating a hardware-trust result with the physically-embedded, read-only hardware-trust key and the hardware-trust challenge number;

the wireless access point transferring the hardware-trust result and responsively receiving an access hardware-trust digital certificate;

the wireless access point wirelessly receiving a hardware-trusted attachment request from the UE and wirelessly transferring the access hardware-trust digital certificate to the UE;

the wireless access point wirelessly exchanging user data with the UE responsive to the UE validating the access hardware-trust digital certificate and responsively storing the user data in the hardware-trusted memory; and the wireless access point exchanging the user data with a data network.

2. The method of claim 1 further comprising:
the wireless access point wirelessly receiving a UE hardware-trust digital certificate from the UE and validating the UE hardware-trust digital certificate with a stored key; and wherein
the wireless access point wirelessly exchanging the user data with the UE responsive to the UE validating the access hardware-trust digital certificate comprises the wireless access point wirelessly exchanging the user data with the UE responsive to the UE validating the access hardware-trust digital certificate and the wireless access point validating the UE hardware-trust digital certificate.

3. The method of claim 1 further comprising:
the wireless access point transferring the access hardware-trust digital certificate to the data network; and wherein
the data network exchanges the user data with the wireless access point responsive to the data network validating the access hardware-trust digital certificate.

4. The method of claim 1 further comprising:
the wireless access point receiving a network hardware-trust digital certificate from the data network and validating the network hardware-trust digital certificate with a stored key; and wherein
the wireless access point exchanging the user data with the data network comprises the wireless access point exchanging the user data with the data network responsive to the wireless access point validating the network hardware-trust digital certificate.

5. The method of claim 1 further comprising:
the wireless access point transferring the access hardware-trust digital certificate to the data network wherein the data network exchanges the user data with the wireless access point responsive to the data network validating the access hardware-trust digital certificate;
the wireless access point receiving a network hardware-trust digital certificate from the data network and validating the network hardware-trust digital certificate with a stored key; and wherein
the wireless access point exchanging the user data with the data network comprises the wireless access point exchanging the user data with the data network responsive to the data network validating the access hardware-trust digital certificate and the wireless access point validating the network hardware-trust digital certificate.

6. The method of claim 1 further comprising:
the wireless access point wirelessly transferring a hardware-trusted Institute of Electrical and Electronic Engineers 802.11 (WIFI) Service Set Identifier (SSID); and wherein
the wireless access point wirelessly receiving the hardware-trusted attachment request from the UE comprises the wireless access point wirelessly receiving the hardware-trusted attachment request from the UE responsive to the UE wirelessly receiving the hardware-trusted WIFI SSID from the wireless access point.

7. The method of claim 1 further comprising:
the wireless access point wirelessly transferring a hardware-trusted Long Term Evolution (LTE) Network Identifier (NID); and wherein
the wireless access point wirelessly receiving the hardware-trusted attachment request from the UE comprises the wireless access point wirelessly receiving the hardware-trusted attachment request from the UE responsive to the UE wirelessly receiving the hardware-trusted LTE NID from the wireless access point.

8. The method of claim 1 wherein the wireless access point exchanging the user data with the data network comprises the wireless access point wirelessly exchanging the user data with the data network.

9. The method of claim 1 further comprising the wireless access point processing the user data with the hardware-trusted circuitry responsive to wirelessly receiving the hardware-trusted attachment request from the UE.

10. A wireless access point has a physically-embedded, read-only hardware-trust key to serve User Equipment (UE) with hardware-trusted wireless data communications and wherein the wireless access point comprises hardware-trusted memory and normal memory, the wireless access point comprising:
data communication transceivers configured to receive a hardware-trust challenge number;
data processing circuitry configured to generate a hardware-trust result with the physically-embedded, read-only hardware-trust key and the hardware-trust challenge number;
the data communication transceivers configured to transfer the hardware-trust result and receive an access hardware-trust digital certificate;
the data communication transceivers configured to wirelessly receive a hardware-trusted attachment request from the UE and wirelessly transfer the access hardware-trust digital certificate to the UE;
the data communication transceivers configured to wirelessly exchange user data with the UE responsive to the UE validating the access hardware-trust digital certificate;
the data processing circuitry configured to store the user data with the hardware-trusted memory; and
the data communication transceivers configured to exchange the user data with a data network.

11. The wireless access point of claim 10 further comprising:
the data communication transceivers configured to wirelessly receive a UE hardware-trust digital certificate from the UE;
the data processing circuitry configured to validate the UE hardware-trust digital certificate with a stored key; and
the data processing circuitry configured to direct the data communication transceivers to wirelessly exchange the user data with the UE responsive to the UE validating the access hardware-trust digital certificate and the data processing circuitry validating the UE hardware-trust digital certificate.

12. The wireless access point of claim 10 further comprising:
the data communication transceivers configured to transfer the access hardware-trust digital certificate to the data network; and wherein
the data network exchanges the user data with the data communication transceivers responsive to the data network validating the access hardware-trust digital certificate.

13. The wireless access point of claim 10 further comprising:
the data communication transceivers configured to receive a network hardware-trust digital certificate from the data network;

the data processing circuitry configured to validate the network hardware-trust digital certificate with a stored key; and the data processing circuitry configured to direct the data communication transceivers to exchange the user data with the data network responsive to the data processing circuitry validating the network hardware-trust digital certificate.

14. The wireless access point of claim 10 further comprising:

the data communication transceivers configured to transfer the access hardware-trust digital certificate to the data network wherein the data network exchanges the user data with the data communication transceivers responsive to the data network validating the access hardware-trust digital certificate;

the data communication transceivers configured to receive a network hardware-trust digital certificate from the data network;

the data processing circuitry configured to validate the network hardware-trust digital certificate with a stored key; and the data processing circuitry configured to direct the data communication transceivers to exchange the user data with the data network responsive to the data processing circuitry validating the network hardware-trust digital certificate and the data network validating the access hardware-trust digital certificate.

15. The wireless access point of claim 10 further comprising:

the data communication transceivers configured to wirelessly transfer a hardware-trusted Institute of Electrical and Electronic Engineers 802.11 (WIFI) Service Set Identifier (SSID); and the data communication transceivers configured to wirelessly receive the hardware-trusted attachment request from the UE responsive to the UE wirelessly receiving the hardware-trusted WIFI SSID from the wireless access point.

16. The wireless access point of claim 10 further comprising:

the data communication transceivers configured to wirelessly transfer a hardware-trusted Long Term Evolution (LTE) Network Identifier (NID); and wherein the data communication transceivers configured to wirelessly receive the hardware-trusted attachment request from the UE responsive to the UE wirelessly receiving the hardware-trusted LTE NID from the wireless access point.

17. The wireless access point of claim 10 wherein the data communication transceivers are configured to wirelessly exchange the user data with the data network.

18. The wireless access point of claim 10 further comprising the data processing circuitry configured to process the user data with the hardware-trusted circuitry responsive to receiving the hardware-trusted attachment request from the UE.

* * * * *